(12) United States Patent
Anderson et al.

(10) Patent No.: US 6,692,189 B2
(45) Date of Patent: Feb. 17, 2004

(54) FLUME FOR OPTIMIZATION OF SEWER SYSTEM AND WASTEWATER TREATMENT PLANT CAPACITY

(75) Inventors: Claude T. Anderson, Forest Lake, MN (US); Ronald L. Jacobson, Rosemount, MN (US); Michael G. Rieth, Woodbury, MN (US)

(73) Assignee: Aqua Flow Technologies LLC, Arden Hills, MN (US)

( * ) Notice: Subject to any disclaimer, the term of this patent is extended or adjusted under 35 U.S.C. 154(b) by 0 days.

(21) Appl. No.: 10/024,914

(22) Filed: Dec. 19, 2001

(65) Prior Publication Data

US 2003/0113167 A1 Jun. 19, 2003

(51) Int. Cl.$^7$ ................................................. E02B 9/04
(52) U.S. Cl. ........................... 405/119; 405/80; 405/39; 405/40; 405/41
(58) Field of Search .............................. 405/39, 40, 41, 405/80, 118, 119, 127, 120, 121; 73/215, 861.63, 861.64

(56) References Cited

U.S. PATENT DOCUMENTS

| | | | | |
|---|---|---|---|---|
| 2,872,810 A | * | 2/1959 | Shaffer | 73/861.63 |
| 3,719,081 A | * | 3/1973 | Lynn et al. | 73/215 |
| 3,774,645 A | * | 11/1973 | Pompa | 73/861.63 |
| 3,894,562 A | * | 7/1975 | Moseley et al. | 73/861.63 |
| 3,934,472 A | * | 1/1976 | Bradham | 73/215 |
| 4,095,466 A | * | 6/1978 | Schontzler et al. | 73/215 |
| 4,671,119 A | * | 6/1987 | Halmi | 73/215 |
| 4,799,388 A | * | 1/1989 | Hunter | 73/215 |
| 5,553,973 A | * | 9/1996 | Duran | 405/120 |

* cited by examiner

Primary Examiner—Frederick L. Lagman

(57) ABSTRACT

A flume for diurnally storing and releasing municipal sewage in its conveyance network of sewers and interceptor piping to reduce peak flow rates in a sewer system and the downstream wastewater treatment plant. The disclosed invention reduces peak flow rates without affecting flow rates below a selected threshold, maintaining minimum flow rates while storing wastewater in sewers and providing features that protect against sewer backups during high flows.

11 Claims, 12 Drawing Sheets

FLUME FOR OPTIMIZATION OF SEWER SYSTEM AND WASTEWATER TREATMENT PLANT CAPACITY

BACKGROUND OF THE INVENTION

This invention relates to an innovative flume for use in sewers to improve the utilization of the sewage collection and conveyance networks as temporary storage units in order to either reduce diurnal peak flow rates at a downstream bottleneck or a wastewater treatment plant (WWTP) or to shift the time period when the peak flow reaches the WWTP.

In the wastewater collection and treatment industry, flumes are well known devices for use as flow measurement devices for open channel flow. A variety of prior-art flumes are available for this use. Specific examples include the Palmer-Bowlus, Parshall, Trapezoidal, Cutthroat and H-flumes. The flow rate for a given flume is a function of the head-loss through the flume. Some flumes, such as a Parshall flume, are designed so that the flow rate through the flume is determined solely as a function of the water height upstream of the flume. Flumes are not used to regulate flow but rather are designed so that the expected range of flows can be accommodated without interfering with the flow rate. Flumes are designed to passively measure all flows within their design range and to minimize altering the fluid flow rate.

Wastewater treatment plants are typically designed and built to treat a fluctuating flow stream, one that varies widely throughout the day and possibly the season in both quantity and strength. Routine flow variations typically occur in a daily cyclical fashion, with flow rates becoming higher than average during the day and lower than average at night. Sometimes the daily flows exhibit a bimodal peak flow with a first peak in the morning and a second peak during the evening. Some sewer systems are also impacted by precipitation events during which rainfall or snowmelt may enter the sewer system through various entry points. These events will also produce peak flow rates that can be significantly higher than the typical diurnal fluctuation. The precipitation related flows also tend to be relatively infrequent due to the generally intermittent nature of precipitation. These variations in flow require process units and equipment to be large enough to meet reasonable daily peak loadings, periodic seasonal peak loadings such as rain events, and the projected demand imposed by future growth. Smoothing the flow at a more even rate results in loadings being more consistent, and biological and energy demands being more stable. Through the dampening effects of equalization, only the treatment units and equipment needed to meet the equalized flows have to be operated. One method known to accomplish equalization is the use of equalization basins. Equalization basins have a volume generally less than 35% of the WWTP capacity. They can be located on site or upstream of the WWTP and arranged as separate in-line or off-line tanks. The result is an overall improvement in WWTP efficiencies, more consistent removal rates, reduced electrical peak-demand charges, and possibly decreased power consumption. Additional benefits include the dissipation of shock loads that most WWTPs experience and the extension of the operating capacity within the existing facility because the initial design capacity was oversized to allow for peak demands.

The use of existing sewer capacity to reduce daily diurnal flows has been described in U.S. Pat. No. 6,318,395 by Anderson, et al. dated Nov. 20, 2001. The present invention describes an innovative flume to be used to reduce the daily diurnal flow peaks.

SUMMARY OF THE INVENTION

This invention relates to an innovative flume for use in sewers to optimize the utilization of the sewage collection and conveyance networks as temporary storage units in order to either reduce peak flow rates reaching a downstream bottleneck area of the sewer system or a wastewater treatment plant (WWTP) and to shift the time period when the peak flow reaches the WWTP to improve performance and reduce costs.

This invention provides a simple, safe and effective flume for controlling wastewater flow rates. A benefit of controlling wastewater flow rates by lowering peak flows to a sewer system and a WWTP, capital expansions can be delayed. Additionally, at a WWTP, lower peak flows result is an overall improvement in WWTP efficiencies, more consistent removal rates, reduced peak-demand charges, and decreased power cost.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is therefore an object of the present invention to provide a new flume to control peak flow rates and thereby improve the performance and reduce the cost of sewage conveyance and treatment. This new method and apparatus has many of the advantages mentioned heretofore and several novel features that result in a new method and apparatus which is not anticipated, rendered obvious, suggested, or even implied by any of the prior art methods to improve the performance and reduce the cost of sewage conveyance and treatment, either alone or in any combination thereof.

Still yet another object of the present invention is to provide a new flume that will use the sewage collection and conveyance networks as temporary storage units in order to control flows resulting in reduced peak flows.

It is another object of the present invention to provide a new flume to reduce peak flow rates or provide flow equalization that can be easily networked throughout a sewer system as needed.

It is another object of the present invention to provide a new method to reduce peak flow rates or provide flow equalization that can be easily configured to meet the individualized requirements of a particular sewer system and the downstream WWTP.

It is another object of the present invention to provide a new flume that allows minimum flow rates in sewers to be maintained upstream and downstream of the flume It is another object of the present invention to provide a new flume that does not interfere with low flows for a sewer.

It is another object of the present invention to provide a new flume that includes overflow features for flows above the flumes capacity.

It is another object of the present invention to provide a new flume that minimizes clogging.

It is another object of the present invention to provide a new flume to reduce peak flow rates or provide flow equalization that can be easily automated.

It is another object of the present invention to provide a new flume to reduce peak flow rates or provide flow equalization that is rugged and reliable.

It is another object of the present invention to provide a new flume to reduce peak flow rates or provide flow equalization which may be easily and efficiently manufactured and marketed.

It is another object of the present invention to control flow rates to a WWTP in a way that lowers the electrical costs for a WWTP.

An even further object of the present invention is to provide a new method to reduce peak flow rates or provide flow equalization which is susceptible of a low cost of manufacture with regard to both materials and labor.

It is another object of the present invention to provide a new flume that is compatible with existing sewer cleaning technology.

The flume must be durable and corrosion resistant. Materials of construction for prior-art flumes in sewer systems would also be appropriate for this invention. Flumes are often made of metals such as aluminum or stainless steel, various plastics, wood, fiberglass or concrete. Materials that are susceptible to corrosion such as iron or steel can also be used if protected with a suitable corrosion resistant coating such as coal tar epoxy paint.

The flume may be constructed out of concrete which could be placed in a removable form or poured into a form that would become an integral part of the flume.

The flume could be provided with attachment points for easy installation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

This invention provides an innovative flume that allows use of excess sewer or interceptor capacity on a regular basis to store and then release partial volumes of the overall sewage flow for a number of benefits including; reducing sewer system bottlenecks, improving WWTP and sewer system performance and to lessen on-peak treatment plant energy consumption.

Usually, there are general similarities among each wastewater treatment plant and its associated interceptor system and the rate structure for the electrical utility it uses to obtain its electricity. However each system is unique with its own specific characteristics. Therefore, it is apparent this invention can either be included as a custom designed system to maximize the benefits for a particular installation or given some minimal design information, as an off the shelf device to provide an inexpensive remedy to reduce peak flows. Generally however, this flume allows sewage in any gravity flow sewer or interceptor segment to purposefully be stored to an elevation up to a maximum above selected to avoid detrimental backups of sewage.

Figure 1:
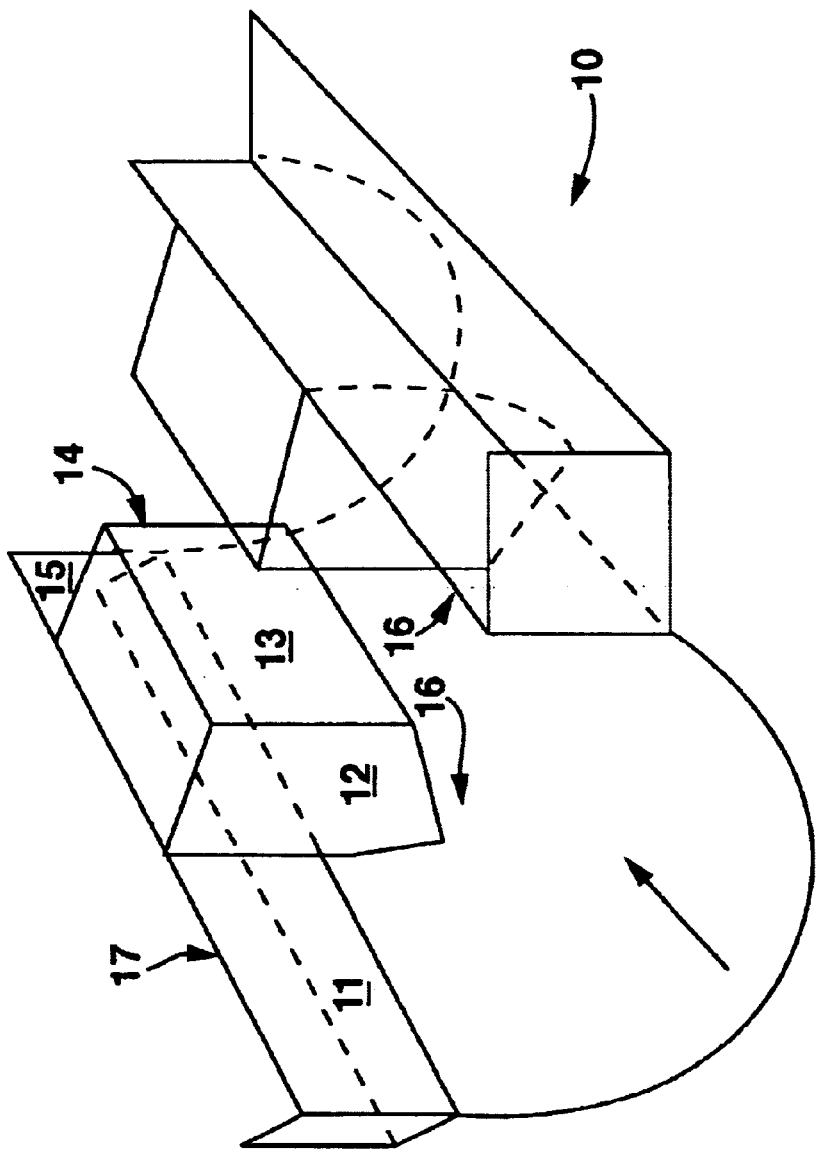
FIG. 1 is a perspective view of one embodiment of a flume in a sewer or interceptor segment.
Figure 2:
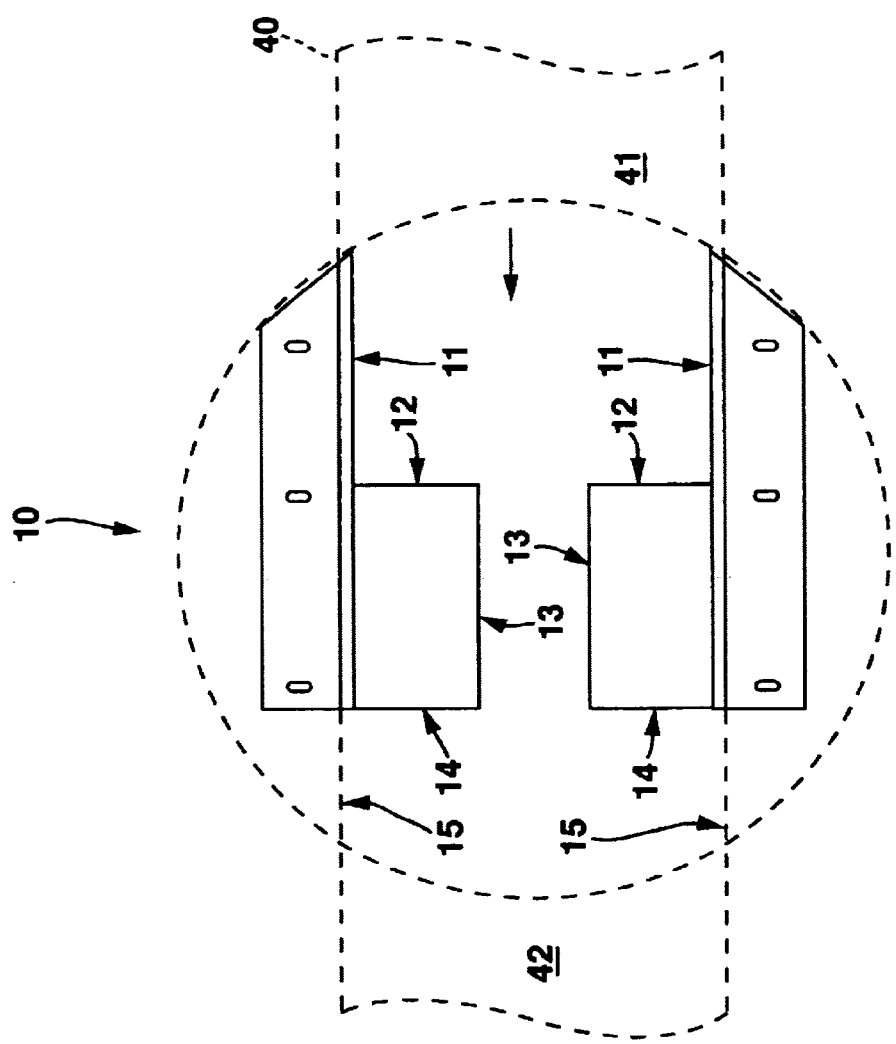
FIG. 2 is a plan view of the flume.
Figure 3:
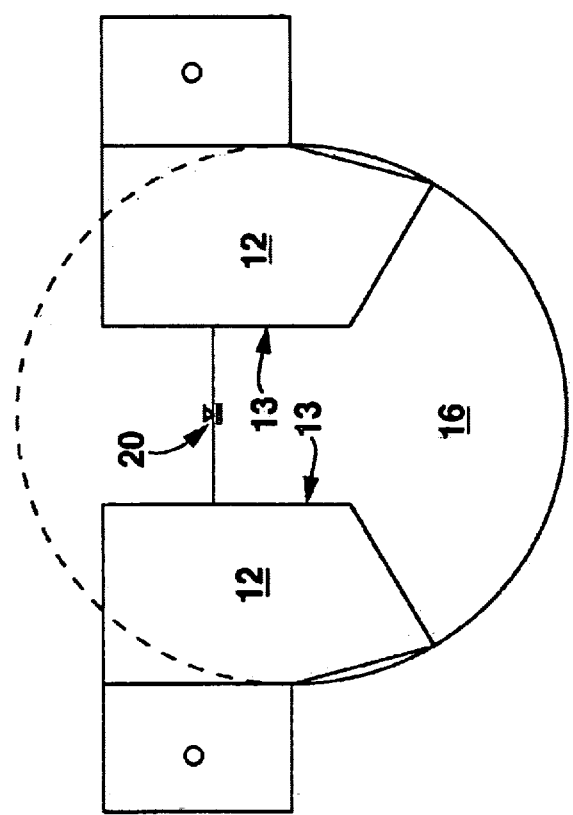
FIG. 3 is a sectional end view of the flume.

With reference to FIGS. 1 to 3, is shown an embodiment of the flume (10) in a typical sewer or conduit (40) receiving wastewater (20) from sewer lines. The flume (10) is typically installed in a manhole, meter vault or similar access structure to provide ease of installation, inspection and maintenance. Wastewater (20) flows through the flume (10) from an upstream segment (41) to a downstream segment (42) of the conduit (40).

The flume has an inlet portion (11) attached to the conduit (40) or sewer. The inlet portion (11) preferably has a top and a bottom, with the bottom being a configuration similar to the conduit and the top being open to provide an overflow section (17). The inlet portion (11) is located between and attached to the conduit (40) and the converging transition (12).

The converging transition provides a restriction to the flow which generates head loss and backs up the flow. The converging transition (12) may be of a variety of configurations. The preferred embodiment includes a flat plate placed perpendicular to the flow and partially blocking the flow to generate a relatively high head loss and retain non-clogging features. The converging transition (12) is located between and attached to the inlet portion (11) and the throat portion (13).

The throat portion (13) provides a relatively narrow opening that greatly restricts the flow of wastewater to generate a relatively high head loss in a relatively short distance. The throat portion is located between and attached to the converging transition (12) and the diverging transition (14).

Figure 4:
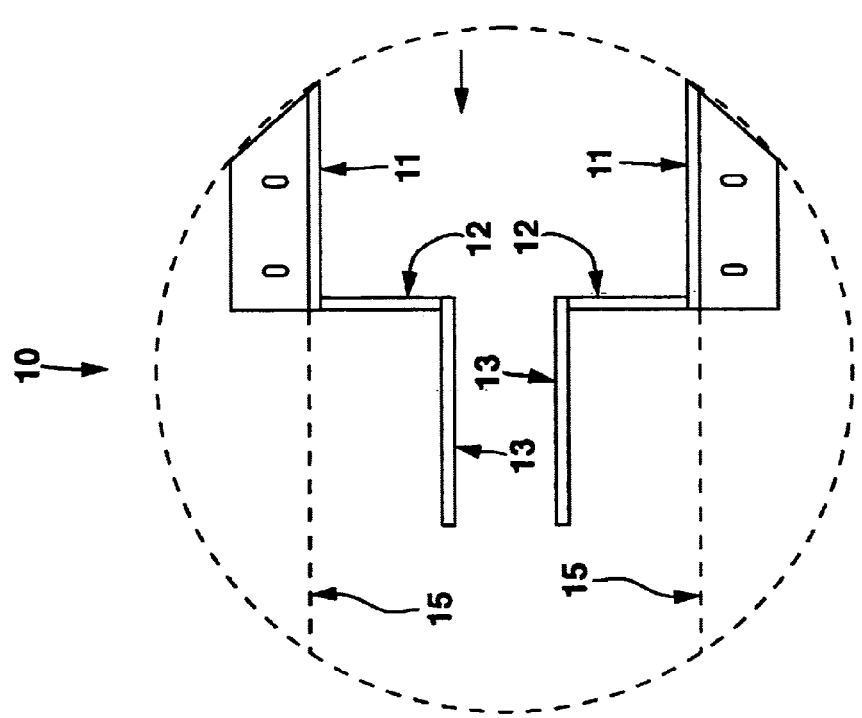
FIG. 4 is a plan view of an alternative embodiment of the flume.

The diverging transition (14) is located between the throat portion and the outlet portion (15). In the preferred embodiment the diverging transition (14) provides additional head loss as an expansion portion of the flume (10). Although the diverging transition (14) may be a variety of configurations or be absent entirely as shown in FIG. 4, having a diverging transition (14) as a mirror image of the converging transition (12) reduces manufacturing costs.

The outlet portion (15) preferably has a top and a bottom, with the bottom being a configuration similar to the conduit and the top being open to accept any overflow from upstream. The outlet portion (15) is located between and attached to the diverging transition (12) and the conduit (40).

The flume (10) may have an unrestricted section (16) disposed along its bottom from the upstream segment (41) to the downstream segment (42). The unrestricted section (16) preferably is included in the inlet portion (11), converging transition (12), throat portion (13), diverging transition (14)

and outlet portion (15) of the flume (10). The unrestricted section (16) allows low flows to proceed unhindered through the flume, thereby not increasing the chance that solids materials would settle out in or upstream of the flume during low flow conditions.

The flume (10) may also may an overflow section (17) disposed along its top in the inlet portion (11), converging transition (12), and throat portion (13) of the flume. When the overflow portion (17) is provided, it is preferably located upstream of the throat portion (13), since any obstruction would most likely occur in the throat portion. The overflow portion may be any type of bypass provision, which would include an integral weir as shown in FIG. 1 or it may be provided as a separate item. The overflow portion (17) defines a weir surface for liquid flow between the upstream segment (41) and the downstream segment (42) for wastewater that exceeds the capacity of the flume so as to prevent sewer backups in the event the flume becomes clogged with debris or other materials.

The flume (10) is installed so that the bottom of the flume (10) is substantially aligned with the bottom of the conduit (40) or sewer. Wastewater flows through the flume (10) from the upstream segment (41) to the downstream segment (42). The flume (10) is preferably removably attached to the conduit (40) with bolts, clamps or slip-joints that slide into the conduit (40). The flume may also be designed to be integrally formed as part of the conduit (40).

Figure 7:
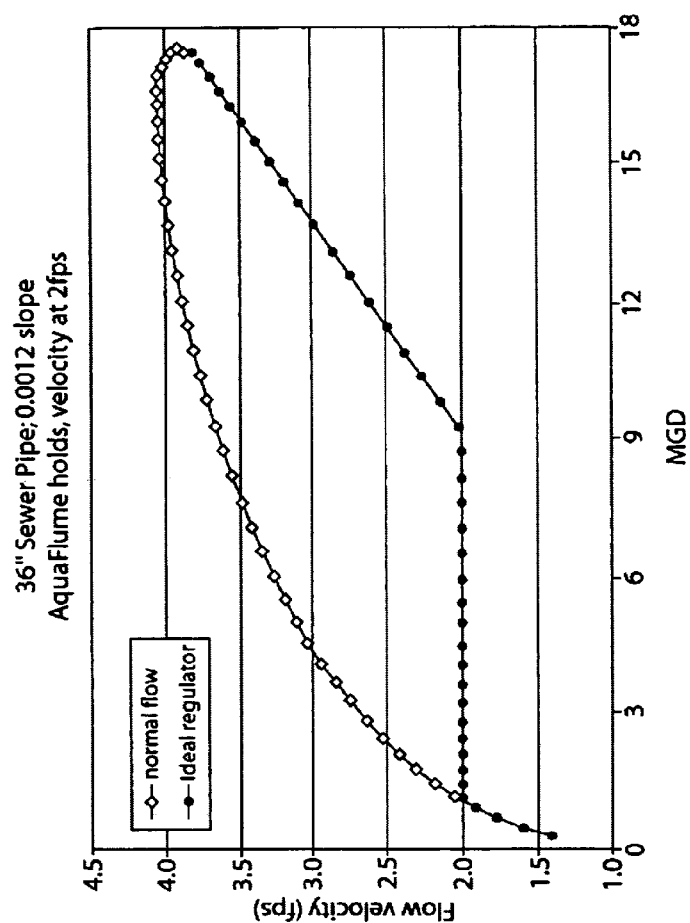
FIG. 7 shows flow velocity as a function of flow rate
Figure 8:
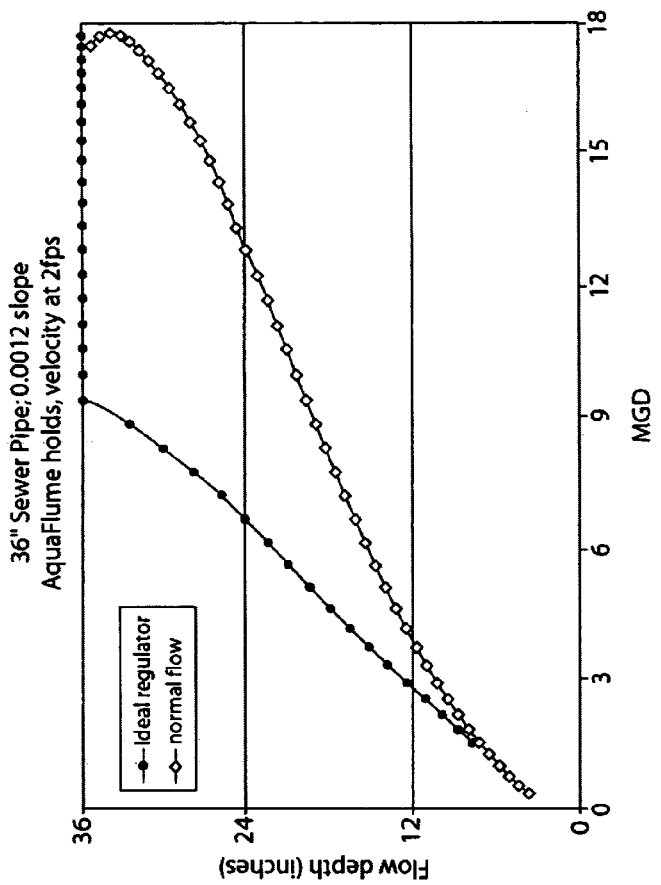
FIG. 8 shows the upstream flow depth for the sewer pipe before and after a flume is installed.

Wastewater flow rates typically follow a diurnal cycle with a minimum flow at night with at least one peak flow rate (21) during the day. The preferred embodiment is designed to not affect wastewater flow (20) below a desired minimum. This minimum can be varied but is often selected to maintain a velocity of 2 feet per second. With reference to FIGS. 7 and 8, as the flow of wastewater (20) in the upstream segment (41) increases, any flow in excess of a predetermined value will begin to be limited by the flume (10) from reaching the downstream segment (42). The wastewater (20) will then begin to backup into the upstream segment (41) of the conduit (40). During this time, the wastewater reaching the downstream section is limited to a flow that can pass through the flume and the conduit (10) upstream of the flume (10) is used for storage.

As the flow further increases to a peak flow rate (21), the wastewater (20) would continue to back up into the conduit or sewer pipe, preferably utilizing the available storage space in the pipe. Flow rates in excess of the expected peak flow rate, such as storm water flows, would utilize the overflow section of the flume to avoid backing up the upstream sewer to a higher elevation than anticipated. Alternatively a separate pipe could be provided as a bypass to further control upstream wastewater depths.

To determine a suitable flume configuration and dimensions for a specific site, a desired head discharge relationship should be estimated for the specific site, and a flume that satisfies these criteria should be obtained. There are three prior art methodologies for determining the head discharge relationship for a flume. These methodologies include; 1) mathematical modeling, 2) laboratory measurements, and 3) field measurements.

Mathematical modeling involves using empirically or theoretically derived mathematical formulas that describe liquid flow in conduits and various fittings and geometric shapes. Mathematical modeling is often the first step in the flume design with laboratory and field measurements used to confirm the suitability of the initial assumptions for the specific site.

To establish the amount of storage available in a particular sewer, it is first necessary to determine how much of the sewer is being used to carry the existing flow. Manning's equation is often used to characterize open channel flow in a conduit or sewer. For Manning's equation to apply, the depth of flow must be constant along the length of pipe, so called normal depth, and the velocity head does not change through the length of the section. Therefore, Manning's equation can often be used to estimate the depth of wastewater downstream of a flume, if the conduit is unaffected by other downstream conditions. Since both velocity and hydraulic radius depend on depth of flow, solving the equation for a particular pipe diameter, Manning's roughness and friction slope includes the steps of choosing a depth, calculating the resulting hydraulic radius and flow velocity, The Manning equation is: $V=(1/n)*k*R^{2/3}*S^{1/2}$ Where:
V=Mean velocity (m/s, ft/s)
K=1.49 for English units, or 1.00 for SI units
N=Manning's roughness (unitless)
R=Hydraulic radius (m, ft)
S=Friction slope (m/m, ft/ft)

To calculate the wastewater depth either within or upstream of the flume, the energy equation can be used. Energy is conserved by balancing the energy across any two points in the system. For a gravity driven open channel flow system the energy equation is:

$$p_1/\gamma + z_1 + V_1^2/2g = p_2/\gamma + z_2 + V_2^2/2g + H_L$$

Where:
p=Pressure (N/m², lb/ft²)
γ=Specific weight of the fluid (N/m³, lb/ft³)
z=elevation at the centroid (m, ft)
V=Fluid velocity (n/s, ft/s)
g=gravitational acceleration (m/s², ft/s²)
$H_L$=Combined head loss (m, ft)

A flume can be represented as a contraction and an expansion in series. The head loss through the flume can be estimated by adding the head loss for the contraction and the expansion. Approximation for the head loss through contractions or expansions are often expressed in terms of the velocity head. For example:

$$\text{For a contraction } H_L = C(V_1^2/2g - V_2^2/2g)$$

$$\text{For an expansion } H_L = C(V_2^2/2g - V_1^2/2g)$$

Where:
C=Head loss coefficient
$V_1$=Upstream fluid velocity (m/s, ft/s)
$V_2$=Downstream fluid velocity (m/s, ft/s)
g=Gravitational acceleration (m/s², ft/s²)
$H_L$=Head loss (m, ft)

The amount of upstream storage available from the head loss contributed by the flume largely depends upon the distance that the change in depth immediately upstream of the flume affects the upstream. This distance depends on the flow rate, slope, diameter and roughness coefficient. An iterative process is used to calculate the change in specific energy and comparing that to the change in slope for upstream segments until the change in specific energy equals the change in slope. The equation to estimate this effect is given by the equation:

$$dE/dy = 1 - Fr^2$$

Where:
dE/dy=Change in specific energy per unit distance
Fr=Froude number
$Fr^2 = Q^2B/gA^3$
A=Cross-sectional area
B=Surface width
Q=Flow rate
g=gravitational constant Using these equations, various configurations of shape and width for the converging transition, throat portion and diverging transition can be evaluated to find a specific geometry that will provide the desired storage without impeding low flows and maintaining the minimum selected flow velocity upstream and downstream of the flume for all expected flow conditions. The flume thereby converts excess velocity to storage in the conduit upstream of the flume. Furthermore, the flow control device may have an overflow or bypass capacity so that flows in excess of the anticipated peak capacity will overflow or bypass the control device without causing problems to the upstream sewer.

Figure 9:
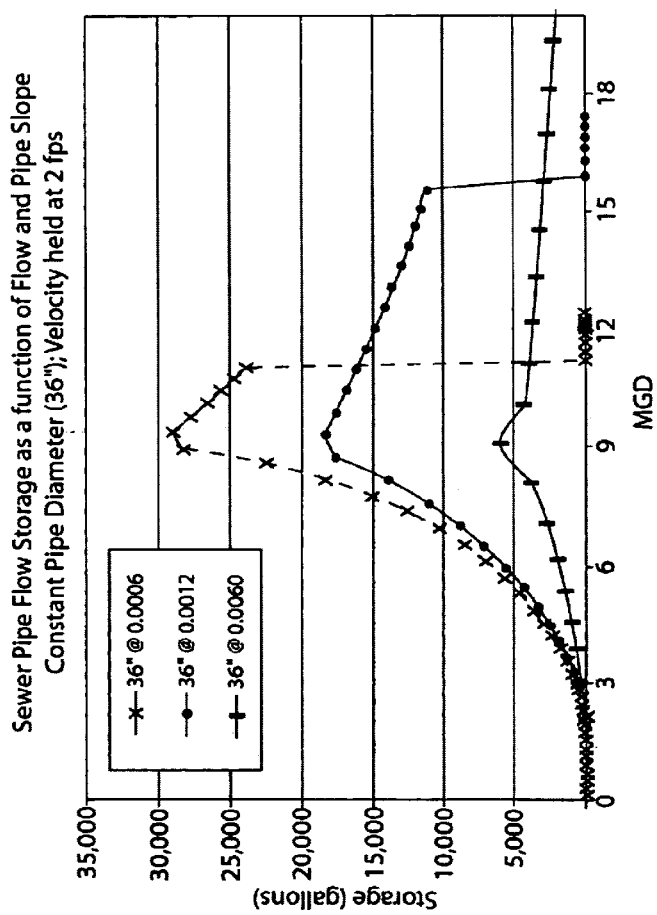
FIG. 9 shows the storage potential for varying sewer pipe slopes.

For example, FIG. 7 shows flow velocity as a function of flow rate for the example given. Flow velocity of the regulated flow is not exceeded until the conduit reaches nearly full capacity. FIG. 8 shows the corresponding upstream flow depth for the sewer pipe before and after a flume is installed. FIG. 9 shows the resulting flow storage available in gallons provided by the flume.

Figure 10:
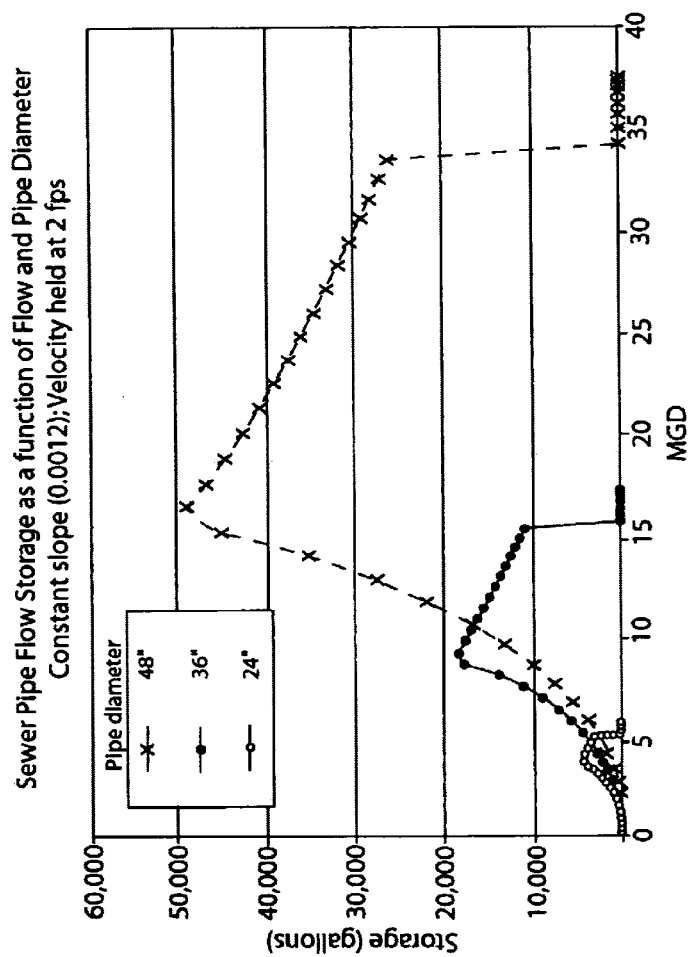
FIG. 10 shows the maximum pipe storage potential for various pipe sizes for the same slope.
Figure 11:
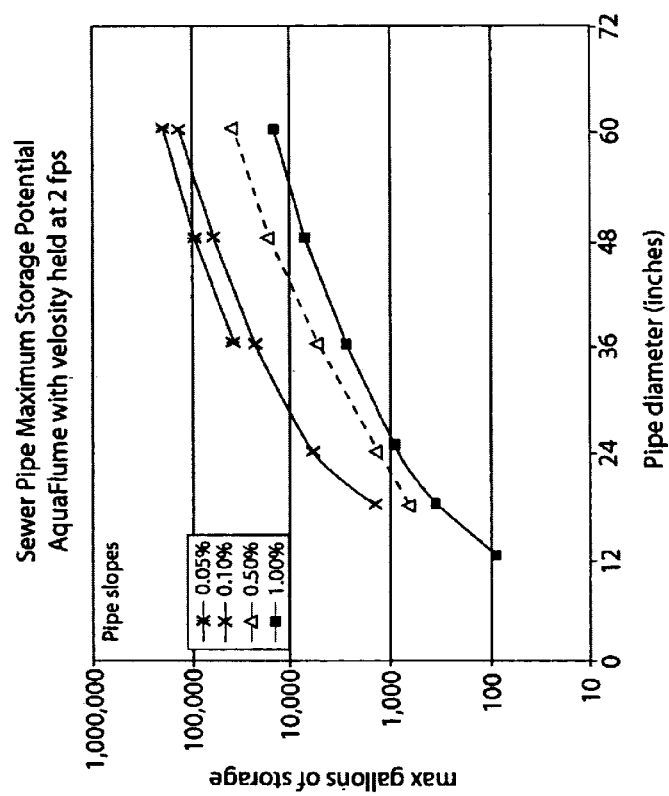
FIG. 11 shows the backwater effect as a function of pipe slope and pipe diameter.
Figure 12:
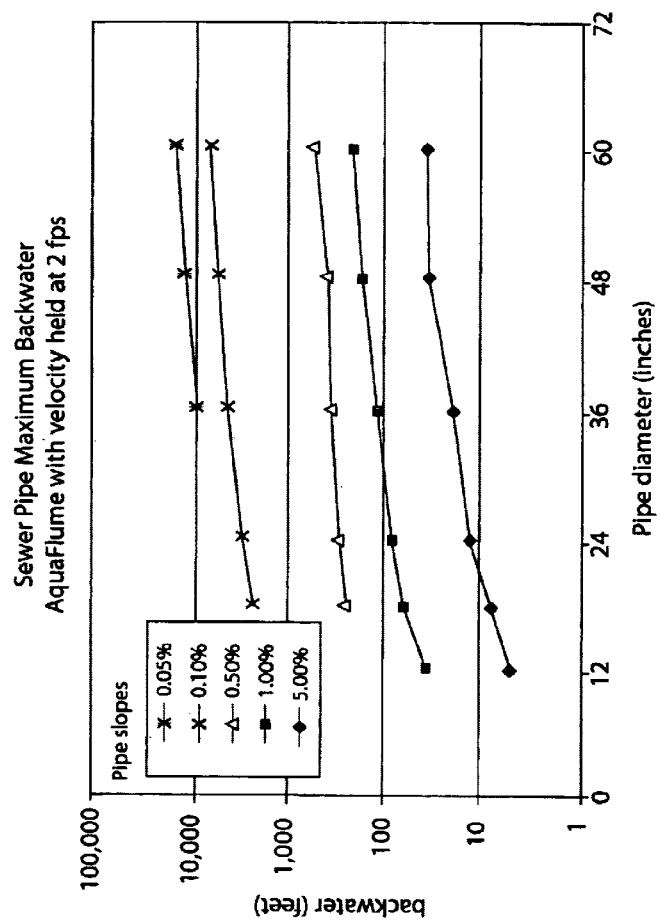
FIG. 12 shows the percent of upstream surcharge in terms of downstream flow depth.

Flow storage is a function of conduit or sewer diameter as shown in FIG. 10 and slope as shown in FIG. 11. The slope is important because it effects the distance upstream that the flume can influence the depth as shown in FIG. 12.

Figure 5:
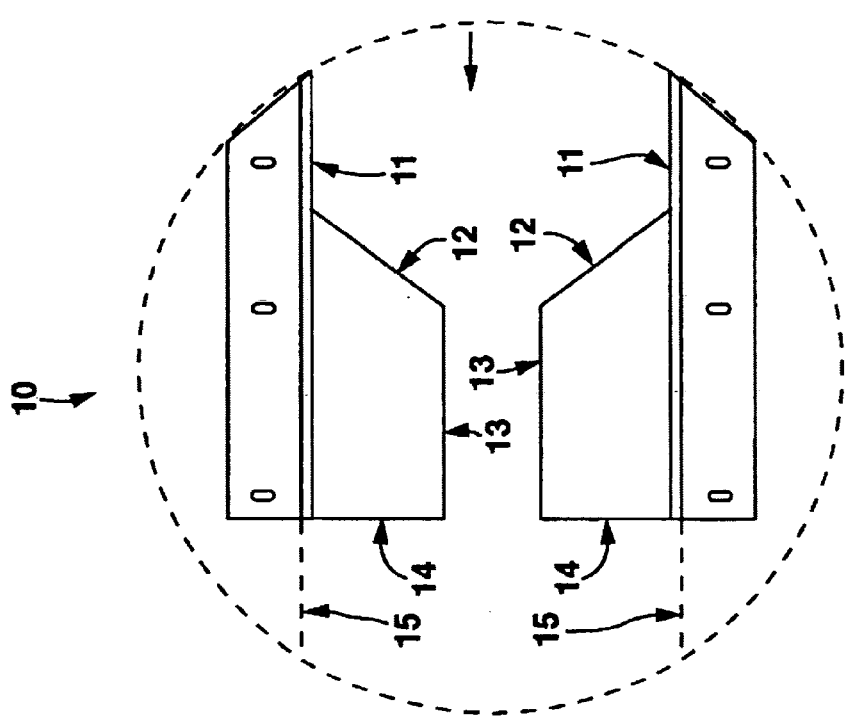
FIG. 5 is a plan view of another embodiment of the flume.
Figure 6:
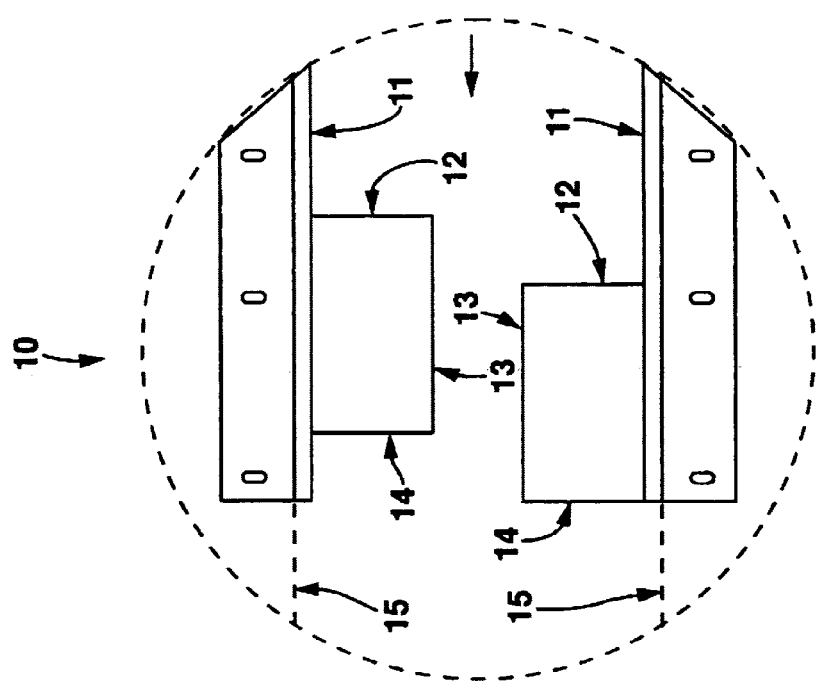
FIG. 6 is a plan view of an alternative embodiment of the flume.

A number of flume embodiments are possible by changing the layout and geometries. Because each site may have specific requirements for its preferred head discharge relationship as well as site specific limitations of size or shape, each layout may have certain advantages in specific situations. FIG. 4 shows a plan view of a flume embodiment that may be fabricated as a one piece unit with a relatively simple geometry since it does not provide the diverging transition. FIG. 5 shows the plan view of a flume embodiment with a tapered converging transition, which would have different head loss characteristics than the other embodiments. FIG. 6 shows a further alternative embodiments of the flume that changes the head loss characteristics of the flume by including an off-set into the basic flume design. The flume may be designed and installed to utilize existing manhole and sewer pipe structure as part of the flume structure, be fabricated as independent units that are connected to sewer pipes, or as units integral with manholes or sewer pipes.

We claim:

1. A flume for reducing a peak flow rate of a wastewater being conveyed within a sewer system, the sewer system containing at least one conduit having an upstream segment and a downstream segment, the flume comprising:

an inlet portion being attached to an upstream segment, the inlet segment receiving the wastewater from the upstream, segment;

a converging transition attached to the inlet portion receiving the wastewater from the inlet portion;

a throat portion attached to the converging transition receiving the wastewater from the converging transition;

wherein a flume lower portion defines a unrestricted section extending from the upstream segment to the downstream segment.

2. The flume of claim 1 further comprising a diverging transition attached to the throat portion receiving the wastewater.

3. The flume of claim 2 further comprising an outlet segment attached to the throat portion receiving the wastewater from the diverging transition.

4. The flume of claim 3 wherein the flume also has an overflow portion.

5. The flume of claim 2 further comprising an outlet segment attached to the throat portion receiving the wastewater from the diverging transition.

6. The flume of claim 5 wherein the flume also has an overflow portion.

7. The flume of claim 5 wherein the throat portion also being integral with the upstream segment.

8. The flume of claim 2 wherein the flume also has an overflow portion.

9. The flume of claim 2 wherein the throat portion also being integral with the upstream segment.

10. The flume of claim 1 wherein the flume also has an overflow portion.

11. The flume of claim 1 wherein the throat portion also being integral with the upstream segment.

\* \* \* \* \*